(12) United States Patent
Becker et al.

(10) Patent No.: US 10,164,958 B2
(45) Date of Patent: Dec. 25, 2018

(54) OPEN ACCESS NETWORK SECURE AUTHENTICATION SYSTEMS AND METHODS

(71) Applicant: Entry Point, LLC, Salt Lake City, UT (US)

(72) Inventors: Christopher D. Becker, Aitkin, MN (US); Sneha Kumar Kasera, Salt Lake City, UT (US); Jacobus E Van der Merwe, Salt Lake City, UT (US)

(73) Assignee: Entry Point, LLC, Salt Lake City, UT (US)

( * ) Notice: Subject to any disclaimer, the term of this patent is extended or adjusted under 35 U.S.C. 154(b) by 319 days.

(21) Appl. No.: 15/000,025

(22) Filed: Jan. 18, 2016

(65) Prior Publication Data

US 2016/0212116 A1    Jul. 21, 2016

Related U.S. Application Data

(60) Provisional application No. 62/104,617, filed on Jan. 16, 2015.

(51) Int. Cl.
*H04L 29/06* (2006.01)
*H04L 9/32* (2006.01)
*H04L 29/08* (2006.01)

(52) U.S. Cl.
CPC ............ *H04L 63/08* (2013.01); *H04L 9/3271* (2013.01); *H04L 63/0884* (2013.01); *H04L 63/10* (2013.01); *H04L 67/16* (2013.01)

(58) Field of Classification Search
CPC ...................................................... H04L 63/08
See application file for complete search history.

(56) References Cited

U.S. PATENT DOCUMENTS

| | | | | |
|---|---|---|---|---|
| 2003/0051041 | A1* | 3/2003 | Kalavade | G06Q 20/14 709/229 |
| 2010/0263032 | A1* | 10/2010 | Bhuyan | H04L 63/061 726/7 |
| 2011/0191842 | A1* | 8/2011 | Lindholm | H04L 9/3271 726/9 |
| 2012/0149334 | A1* | 6/2012 | Zhang | H04L 63/0838 455/411 |
| 2014/0245003 | A1* | 8/2014 | Barker | H04L 63/08 713/168 |
| 2015/0296378 | A1* | 10/2015 | Plestid | H04W 12/06 455/411 |

\* cited by examiner

*Primary Examiner* — William S Powers
(74) *Attorney, Agent, or Firm* — Kirton McConkie; Brian Tucker

(57) ABSTRACT

Authentication of devices to receive services provided by service providers over communications networks such as open access networks, wherein the provider of the network need not have access to secret information shared between the devices and the service providers. A request is received from a device to receive services from a service provider and is forwarded to the service provider. A challenge and an expected response is received from the service provider and the challenge is forwarded to the device. A response to the challenge is received from the device the device is authenticated to receive services from the service provider if the response received from the device matches the expected response provided by the service provider.

20 Claims, 16 Drawing Sheets

OPEN ACCESS NETWORK SECURE AUTHENTICATION SYSTEMS AND METHODS

CROSS-REFERENCE TO RELATED APPLICATIONS

This application claims the benefit of U.S. Provisional Application No. 62/104,617, filed Jan. 16, 2015 and is related to U.S. patent application Ser. No. 14/764,136, filed Jul. 28, 2015, which claims the benefit of U.S. Provisional Application No. 61/867,297, filed Aug. 19, 2013, the entirety of which applications are incorporated herein by reference for all they disclose.

BACKGROUND OF THE INVENTION

1. Field of the Invention

The present invention relates to providing security and access to open service networks, and more particularly to providing secure access between multiple service providers and customers across open service networks.

2. Background and Related Art

An open access network is a business model where one party (the network operator) owns, controls, and/or maintains the underlying network infrastructure and other parties (the service providers) use the shared infrastructure to provide services to the end users. This is different than most networks today where one entity both owns the network infrastructure and provides services over it. In an open access network, when a user wants a service, they contact a service provider to sign up for service. The service provider then contacts the network operator to set up the connection between the service provider and the end user. Typically, service providers are paid by the end users, and the network operator is paid by the subscribers and/or the service providers. A high level overview of an open access network can be seen in FIG. 1.

A difficulty with providing open access networks is the provision of access to service providers and end users in a secure fashion that prevents unpaid and unauthorized use of network resources and/or service provider services. For example, an end user who wishes to use infrastructure and bandwidth that is not paid for or is not authorized for the end user at his or her current location (an "adversary") may use a variety of approaches to attempt to achieve the desired access. The provider of the open access network and/or the service providers must protect against the efforts of such adversaries.

BRIEF SUMMARY OF THE INVENTION

Implementations of the invention provide systems and methods for authentication of devices to receive services provided by service providers over communications networks such as open access networks, wherein the provider of the network need not have access to secret information shared between the devices and the service providers. In accordance with one implementation, a method for authenticating a device to receive services provided by a service provider over a communications network, includes steps of receiving a request over a communications network from a network-connected device to receive services from a service provider over the network and forwarding the request to the service provider over the network. The method also includes steps of receiving a challenge and an expected response from the service provider over the network and forwarding the challenge to the device over the network. The method finally includes steps of receiving a response to the challenge from the device over the network and authenticating the device to receive services from the service provider if the response received from the device matches the expected response provided by the service provider.

In accordance with this method, the service provider may differ from a network provider providing infrastructure of the communications network. The network provider authenticates the device to receive services from the service provider without knowing a shared secret shared between the service provider and the device. The method may also include steps of notifying the service provider that authentication was successful and establishing a network connection between the service provider and the device. The network connection between the service provider and the device may be a service logical network.

The method may also include a step of establishing a bootstrapping logical network between the device and an authentication portal to be used during the authentication process. Network and service provider resources provided or accessible over the bootstrapping logical network may be restricted to resources necessary to provide authentication.

According to further implementation of the invention, a method for authenticating a device to receive services provided by a service provider over an open-access communications network includes steps of receiving a request over an open-access communications network provided by a network provider from a network-connected device to receive services from a service provider over the network and using network resources to forward the request to the service provider over the network. The method also includes steps of receiving a challenge and an expected response from the service provider over the network and forwarding the challenge to the device over the network. Other steps of the method include receiving a response to the challenge from the device over the network and authenticating the device to receive services from the service provider if the response received from the device matches the expected response provided by the service provider.

The service provider and the network provider may be different entities. The network provider may authenticate the device to receive services from the service provider without knowing a shared secret shared between the service provider and the device. The network provider may notify the service provider that authentication was successful and may establish a network connection between the service provider and the device. The network connection between the service provider and the device may be a service logical network established by the network provider. The network provider may establishing a bootstrapping logical network between the device and an authentication portal to be used during the authentication process. Network and service provider resources available over the bootstrapping logical network may be restricted to resources necessary to provide authentication.

According to further implementation of the invention, a system for providing authentication services between an access device communicatively connected to an open access network and a service provider with infrastructure communicatively connected to the open access network includes an open access network communicatively connected to an access device and infrastructure provided by a service provider and a network operator authentication server. The network operator authentication service may be configured to receive a request over the network from the access device to receive services from the service provider over the network, forward the request to the service provider over the network, receive a challenge and an expected response from the service provider over the network, forward the challenge to the access device over the network, receive a response to the challenge from the device over the network, and authenticate the device to receive services from the service provider if the response received from the device matches the expected response provided by the service provider.

The network operator authentication server may further be configured to provide new devices subscribing to the network with a virtual subscriber ID manager and a network operator profile to be managed by the virtual subscriber ID manager. The system may include a bootstrapping logical network established on infrastructure of the open access network to establish a communicative connection between the access device and the network authentication server. The system may further include a portal logical network established on infrastructure of the open access network to establish a communicative connection between the network authentication server and infrastructure of the service provider. The portal logical network may communicatively connect with a service provider authentication server. After authentication is complete, the system may also include a service logical network established on infrastructure of the open access network to establish a communicative connection between the access device and infrastructure of the service provider.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
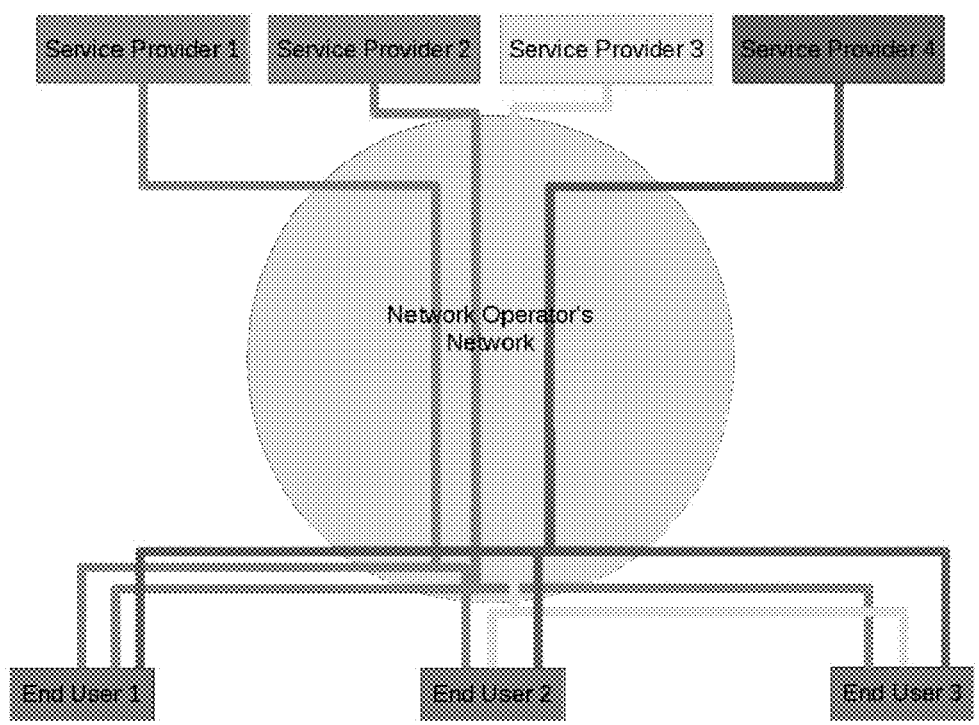
FIG. 1 shows a conceptual illustration of an exemplary open access network.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide systems and methods for authentication of devices to receive services provided by service providers over communications networks such as open access networks, wherein the provider of the network need not have access to secret information shared between the devices and the service providers. In accordance with one embodiment, a method for authenticating a device to receive services provided by a service provider over a communications network, includes steps of receiving a request over a communications network from a network-connected device to receive services from a service provider over the network and forwarding the request to the service provider over the network. The method also includes steps of receiving a challenge and an expected response from the service provider over the network and forwarding the challenge to the device over the network. The method finally includes steps of receiving a response to the challenge from the device over the network and authenticating the device to receive services from the service provider if the response received from the device matches the expected response provided by the service provider.

In accordance with this method, the service provider may differ from a network provider providing infrastructure of the communications network. The network provider authenticates the device to receive services from the service provider without knowing a shared secret shared between the service provider and the device. The method may also include steps of notifying the service provider that authentication was successful and establishing a network connection between the service provider and the device. The network connection between the service provider and the device may be a service logical network.

The method may also include a step of establishing a bootstrapping logical network between the device and an authentication portal to be used during the authentication process. Network and service provider resources provided or accessible over the bootstrapping logical network may be restricted to resources necessary to provide authentication.

According to further embodiments of the invention, a method for authenticating a device to receive services provided by a service provider over an open-access communications network includes steps of receiving a request over an open-access communications network provided by a network provider from a network-connected device to receive services from a service provider over the network and using network resources to forward the request to the service provider over the network. The method also includes steps of receiving a challenge and an expected response from the service provider over the network and forwarding the challenge to the device over the network. Other steps of the method include receiving a response to the challenge from the device over the network and authenticating the device to receive services from the service provider if the response received from the device matches the expected response provided by the service provider.

The service provider and the network provider may be different entities. The network provider may authenticate the device to receive services from the service provider without knowing a shared secret shared between the service provider and the device. The network provider may notify the service provider that authentication was successful and may establish a network connection between the service provider and the device. The network connection between the service provider and the device may be a service logical network established by the network provider. The network provider may establishing a bootstrapping logical network between the device and an authentication portal to be used during the authentication process. Network and service provider resources available over the bootstrapping logical network may be restricted to resources necessary to provide authentication.

According to further embodiments of the invention, a system for providing authentication services between an access device communicatively connected to an open access network and a service provider with infrastructure communicatively connected to the open access network includes an open access network communicatively connected to an access device and infrastructure provided by a service provider and a network operator authentication server. The network operator authentication service may be configured to receive a request over the network from the access device to receive services from the service provider over the network, forward the request to the service provider over the network, receive a challenge and an expected response from the service provider over the network, forward the challenge to the access device over the network, receive a response to the challenge from the device over the network, and authenticate the device to receive services from the service provider if the response received from the device matches the expected response provided by the service provider.

The network operator authentication server may further be configured to provide new devices subscribing to the network with a virtual subscriber ID manager and a network operator profile to be managed by the virtual subscriber ID manager. The system may include a bootstrapping logical network established on infrastructure of the open access network to establish a communicative connection between the access device and the network authentication server. The system may further include a portal logical network established on infrastructure of the open access network to establish a communicative connection between the network authentication server and infrastructure of the service provider. The portal logical network may communicatively connect with a service provider authentication server. After authentication is complete, the system may also include a service logical network established on infrastructure of the open access network to establish a communicative connection between the access device and infrastructure of the service provider.

Embodiments of the invention serve various goals relating to providing security and authentication over networks such as open access networks. Although the systems and methods discussed herein are applicable to open access networks, such goals may be realized via similar systems and methods on networks other than open access networks, and embodiments of the invention embrace use of the described technology, systems, and methods on networks other than open access networks. One of the goals achieved by the systems and methods described herein is a goal of fine-grained access control. In other words, embodiments of the invention allow subscribers and devices to authenticate for and with individual service providers for individual services, and a single access device is not necessarily limited to receiving services from a single service provider.

Another of the goals achieved by the systems and methods described herein is that of mobility of services. In other words, a subscriber need not necessarily be limited to obtaining services from a selected service provider at a single physical location. If the subscriber's agreement with the network operator and/or service provider limits the subscriber to receiving the services at a single location, the authentication procedures allow the network operator to verify the subscriber's location (e.g., on the physical network infrastructure) via any available protocol and to limit and reject attempts to access services elsewhere, but if the service provider and network operator wish to allow portability of services, embodiments of the invention allow the subscriber and/or access device to access the network, authenticate to receive services, and be delivered services at different locations. In some instances, the subscriber might even be allowed to simultaneously access services at multiple locations, or the system could limit access to a single location at any one time.

Another of the goals achieved by systems and methods in accordance with embodiments of the invention described herein is that of authentication. This goal of authentication ensures that services are only provided to authorized subscribers at authorized locations. Another related goal achieved by systems and methods in accordance with embodiments of the invention described herein is that of providing security and privacy. The systems and methods described herein achieve these goals while satisfying the need to protect users from malicious service providers. Meanwhile the systems and methods do this while protecting communications between users and service providers even from the network operator, while protecting the resources of the network operator and the service providers from authorized use, and while protecting secrets shared between the service providers and their subscribers. Thus, embodiments of the invention take into account the complex business relationships between the different parties (network operator, service providers, subscribers, etc.), allowing information to be hidden from disclosure, and while providing systems and methods for secure authentication.

The systems and methods in accordance with embodiments of the invention are provided while addressing the challenges presented by traditional methods. For example, according to traditional methods, devices are normally minimally authenticated. Embodiments of the invention provide full authentication procedures that can distinguish between authentication for the network itself and each individual service provider. Traditional systems typically use all or nothing access control, where an authenticating device gains full access or no access. In contrast, embodiments of the invention provide fine-grained authentication, allowing a single subscriber or device to individually authenticate with the network operator and with each service provider. Traditional systems struggle to provide sufficient capabilities while limiting the amount of information shared. Embodiments of the invention provide capabilities across service providers and networks while preventing the disclosure of information beyond where it is needed: subscribers are able to authenticate to service providers without the network operator becoming aware of secrets shared between the subscribers and service providers, and logical networks imposed upon the physical network structure allows the secure sharing of information once services have been authenticated.

Embodiments of the invention allow the network operator to automatically detect the location on the physical network of an end device attempting to access network and/or service provider resources. This may occur, e.g., via identification of the network optical terminal or other network access device used to access the network infrastructure. The network optical terminal or other network access device provides a link between the subscriber and the network and service provider resources that are provided according to the principles discussed in more detail below. Although the network operator discovers the physical location of the device automatically through any applicable protocol, the service provider need not know the location of the access device and further need not know the topology of the physical or logical network provided by the network operator to set up or use the connection between the service provider and the subscriber. Instead, the network provider establishes any connections needed for authentication, and after authentication occurs and the service provider initiates a connection between it and the subscriber, the network operator establishes a logical network connection between the service provider and the subscriber, as described in more detail in the related U.S. patent application Ser. No. 14/764,136, filed Jul. 28, 2015.

Security may be provided via a variety of protections. Session keys between the subscribers and the service providers can be bootstrapped from the protocols discussed herein. The service provider and the subscribers both agree to a connection before it is established. There is two-way authentication between the user and the service provider, all passed through the network operator without the network operator becoming privy to the secrets shared by the service provider and its subscribers, and there are no long-term secrets shared between the network operator and the service provider. Although systems and methods in accordance with embodiments of the invention use processes similar to authentication protocols of SIMs of cellular networks, the systems and methods described herein provide increased capabilities and more fine-grained access control, so that multiple virtualized SIMs can be used on a single machine, and the implementation via software allows ease of upgrading and addressing of any errors or software bugs.

Embodiments of the invention may be implemented with or without features similar to those provided by the trusted platform module (TPM) schema. If the TPM features are not used, there are no special hardware requirements for the end device accessing the system. In contrast, in embodiments implementing TPM features, the access device may have features acting similar to traditional SIMs, and the access device may need to be modified by the network operator or might be purchased directly from the network operator. The TPM features may serve to prevent shared secrets from being copied and/or from being read by potentially malicious or compromised end devices. Embodiments of the invention embrace systems with and without TPM features.

Figure 2:
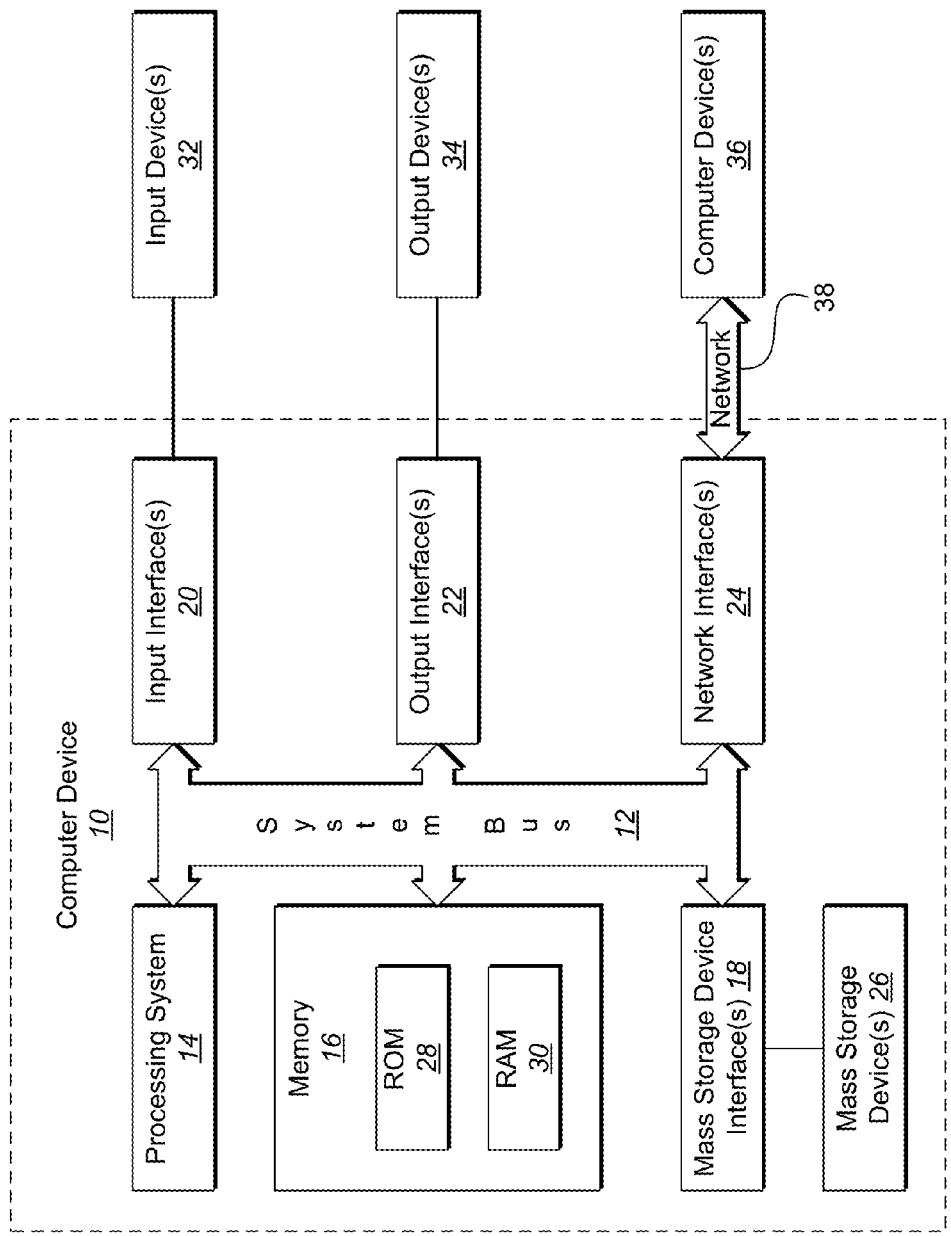
FIG. 2 shows a depiction of an illustrative computer device.
Figure 3:
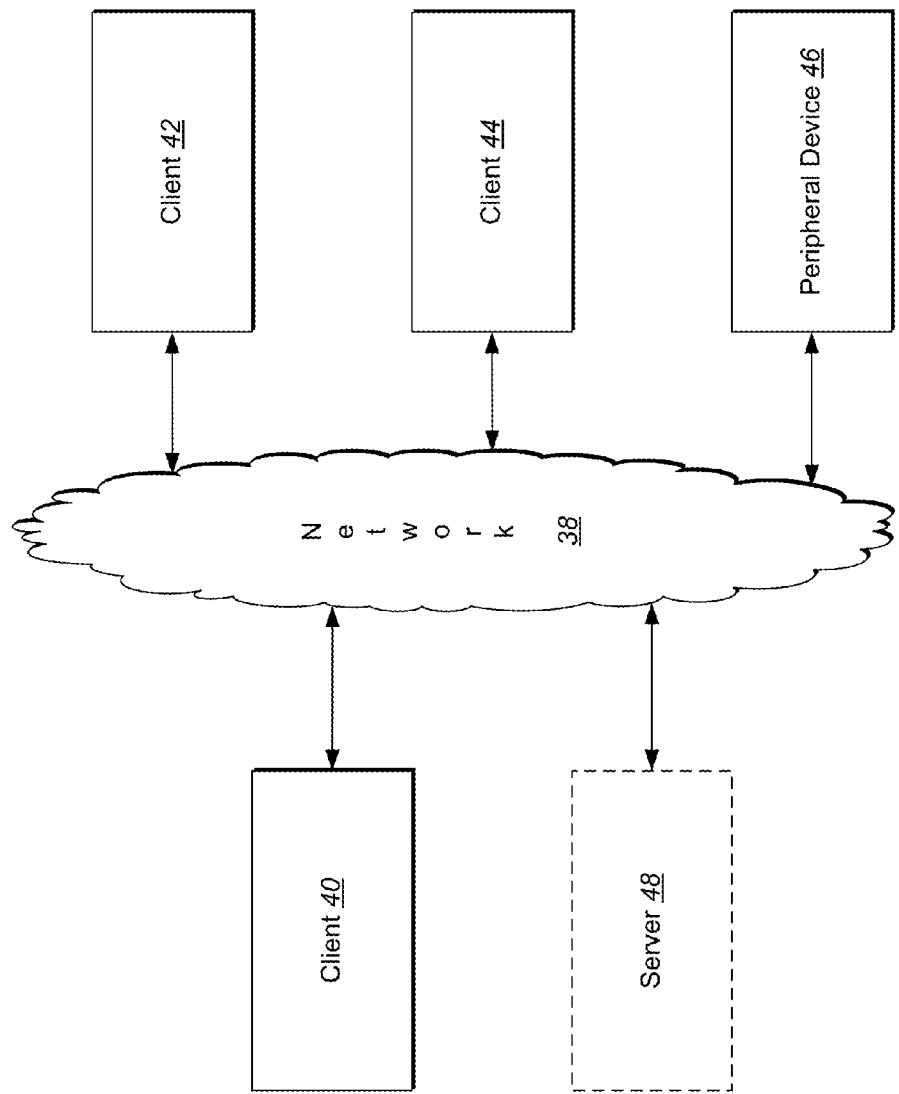
FIG. 3 shows a depiction of an illustrative computer network system.

FIGS. 2 and 3 and the corresponding discussion are intended to provide a general description of a suitable operating environment in which certain embodiments of the invention may be implemented. One skilled in the art will appreciate that embodiments of the invention may be practiced by or with one or more computing devices and in a variety of system and network configurations. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand-alone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations thereof) used herein are intended to exclude transitory propagating signals per se.

With reference to FIG. 2, a representative system for use with or for implementing certain embodiments of the invention includes computer device 10, which may be a general-purpose or special-purpose computer or any of a variety of consumer electronic devices. For example, computer device 10 may be a server, a personal computer, a notebook or laptop computer, a netbook, a personal digital assistant ("PDA") or other hand-held device, a smart phone, a tablet computer, a workstation, a minicomputer, a mainframe, a supercomputer, a multi-processor system, a network computer, a processor-based consumer electronic device, a computer device integrated into another device or vehicle, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a flash drive, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12.

Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include solid-state memory drives, flash drives, hard disk drives, magnetic disk drives, tape drives and optical disk drives. A mass storage device 26 may read from and/or write to a solid-state drive, a flash drive, a magnetic hard disk, a removable magnetic disk, a magnetic cassette, an optical disk, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, a touch screen, a motion capture device, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired (electrical and/or optical) and/or wireless links. Examples of network interfaces include a network adapter for connection to an optical network, a network adapter for connection to a local area network ("LAN") or a modem, a wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Thus, while those skilled in the art will appreciate that embodiments of the present invention may be practiced in a variety of different environments with many types of system configurations, FIG. 3 provides a representative networked system configuration that may be used in association with embodiments of the present invention. The representative system of FIG. 3 includes a computer device, illustrated as client 40, which is connected to one or more other computer devices (illustrated as client 42 and client 44) and one or more peripheral devices 46 across network 38. While FIG. 3 illustrates an networked system that includes a client 40, two additional clients, client 42 and client 44, one peripheral device 46, and optionally a server 48, connected to network 38, alternative embodiments include more or fewer clients, more than one peripheral device 46, no peripheral devices 46, no server 48, and/or more than one server 48 connected to network 38. Other systems may include local, networked, or peer-to-peer environments where one or more computer devices may be connected to one or more local or remote peripheral devices. Moreover, embodiments in accordance with the present invention also embrace use with a single or multiple electronic consumer devices, wireless networked environments, and/or wide area networked environments, such as the Internet.

Similarly, embodiments of the invention embrace cloud-based architectures where one or more computer functions are performed by remote computer systems and devices at the request of a local computer device. Thus, returning to FIG. 3, the client 40 may be a computer device having a limited set of hardware and/or software resources. Because the client 40 is connected to the network 38, it may be able to access hardware and/or software resources provided across the network 38 by other computer devices and resources, such as client 42, client 44, server 48, or any other resources. The client 40 may access these resources through an access program, such as a web browser, and the results of any computer functions or resources may be delivered through the access program to the user of the client 40. In such configurations, the client 40 may be any type of computer device or electronic device discussed above or known to the world of cloud computing, including traditional desktop and laptop computers, smart phones and other smart devices, tablet computers, televisions, any of a variety of devices connectable to the Internet ("Internet of things" devices), or any other device able to provide access to remote computing resources through an access program such as a browser.

According to embodiments of the invention, systems and methods are provided to provide security and access to open service networks, including providing secure access between multiple service providers and customers across open service networks. Increasingly, governments and municipalities are viewing network access and more specifically broadband network access to be a utility that should be provided by the government/municipality. Governments and municipalities are, in many instances, providing the basic network infrastructure, such as electrical or optical (fiber) wired networks and/or wireless networks reaching their constituencies. In some instances, wireless networks may consist of or incorporate cellular networks, such as 2G, 3G, and 4G networks provided by the government/municipality. Rather than provide services themselves, the municipalities and governments often allow service providers and other third parties to provide a variety of services over the network infrastructure, such as Internet access, telephone services (e.g. voice over Internet protocol or VoIP), cable or other television services, and the like.

As discussed above, an open access network is a business model where one party (the network operator, which is often, but not necessarily, a governmental or quasi-governmental entity or municipality) owns and maintains the underlying network infrastructure and other parties (the service providers) use the shared infrastructure to provide services to the end users. This is different than most networks today where one entity both owns the network infrastructure and provides services over it. In an open access network, when a user wants a service, they contact a service provider to sign up for service. The service provider then contacts the network operator to set up the connection between the service provider and the end user. Typically, service providers bill end users for the services they provide and pay the network operator for the service providers' network utilization. In some instances, end users may become temporary service providers to other end users, establishing connections to other end users using similar procedures as discussed herein. A high level overview of an open access network can be seen in FIG. 1.

A difficulty with providing open access networks is the provision of access to service providers and end users in a secure fashion that prevents unpaid and unauthorized use of network resources and/or service provider services. For example, an end user who wishes to use infrastructure and bandwidth that is not paid for or is not authorized for the end user at his or her current location (an "adversary") may use a variety of approaches to attempt to achieve the desired access. The network operator and/or the service providers must protect against the efforts of such adversaries. Embodiments of the invention provide systems and methods for providing such protection while also providing functionality connecting service providers and end users, all while potentially allowing for portability of end user services to various nodes of the network infrastructure. One environment in which embodiments of the invention may be provided is disclosed in more detail in related U.S. patent application Ser. No. 14/764,136, filed Jul. 28, 2015 (the "related application"), which is incorporated herein by reference.

Certain frameworks can be used to automate parts of network management. For example, a framework may be used that is able to gather information about the network such as where in the network a request is coming from, and that can provide an application program interface (API) that service providers can use to set up a connection between the service provider and an end user. Such a framework is disclosed in the related application, and may hereafter be referred to as FlowOps. It should be understood that other frameworks may be similarly used, and embodiments of the invention are not limited to any specific framework disclosed in the related application. Any framework providing the necessary criteria may be used.

When referring to an open access network, it may be useful to use certain terminology, which terminology is defined as follows in this application, unless expressly defined differently in a certain context. A "logical network" may be defined as a network that has no physical infrastructure of its own but may share a physical infrastructure with other logical networks. A "bootstrapping logical network" may be defined as a logical network that users are assigned to before authentication occurs. A bootstrapping logical network provides a minimal level of connectivity to allow users to sign up for service(s) and authenticate to the network provider or service provider. A "service logical network" may be defined as a logical network that provides service between a user and a service provider. A "portal logical network" may be defined as a logical network that allows the user to access web portals and sign up for service from service providers.

An "optical network terminal" (ONT) may be defined as a device at the border of a network operator's optical network that converts optical signals from the network operator's fiber optic network to electrical signals used by the end user's local Ethernet network. An "E-Line topology" may be defined as a logical network topology consisting of two endpoints that can communicate with each other. An "E-Tree topology" may be defined as a logical network topology consisting of a root node and multiple leaf nodes. The leaf nodes can communicate with any of the root nodes, but not with other leaf nodes. A "virtual private network" (VPN) may be defined as a virtual point-to-point connection that is established over another network such as the Internet.

According to embodiments of the invention, the network operator and the service providers wish to avoid having unauthorized adversaries utilize network resources and service provider resources. Meanwhile, the adversary wishes to use infrastructure, bandwidth, and/or services that are not paid for by the adversary or are not paid for use at the current location of the adversary. According to embodiments of the invention, measures are provided to protect against various methods of attack that might be used by adversaries.

As one example, end users initially accessing the network are limited to access via the unauthenticated, bootstrapping, logical network of the network operator's infrastructure. Thus, an adversary that is not using or behind an end device that has already been authenticated by the network operator is unable to access more than the network operator's bootstrapping network without providing a valid authentication to the network operator (and, if service provider resources are to be used, to the applicable service provider). If the adversary does not have valid credentials for the network operator, the adversary can proceed no farther. End users are required to authenticate using a shared secret before access is granted to resources other than the bootstrapping network.

From the perspective of the service provider, the adversary wishes to use services that have not been subscribed to and paid for by the adversary, or are not authorized at the adversary's current location. When the adversary is unable to authenticate to the service provider using the shared secret, or when the network operator framework identifies that an incoming request is coming from an unauthorized location (e.g., by identifying the node of the network from which the request originates), the same effect results: the adversary is limited to the bootstrapping network and is unable to access service provider resources. As the service provider must first authorize establishment of a logical network to provide its services, and without proper authentication via a location-valid shared secret, the service provider will not instruct the network operator to establish the logical network. As will be described in more detail below, other forms of attack are similarly prevented or abrogated using embodiments and implementations of the invention.

Figure 4:
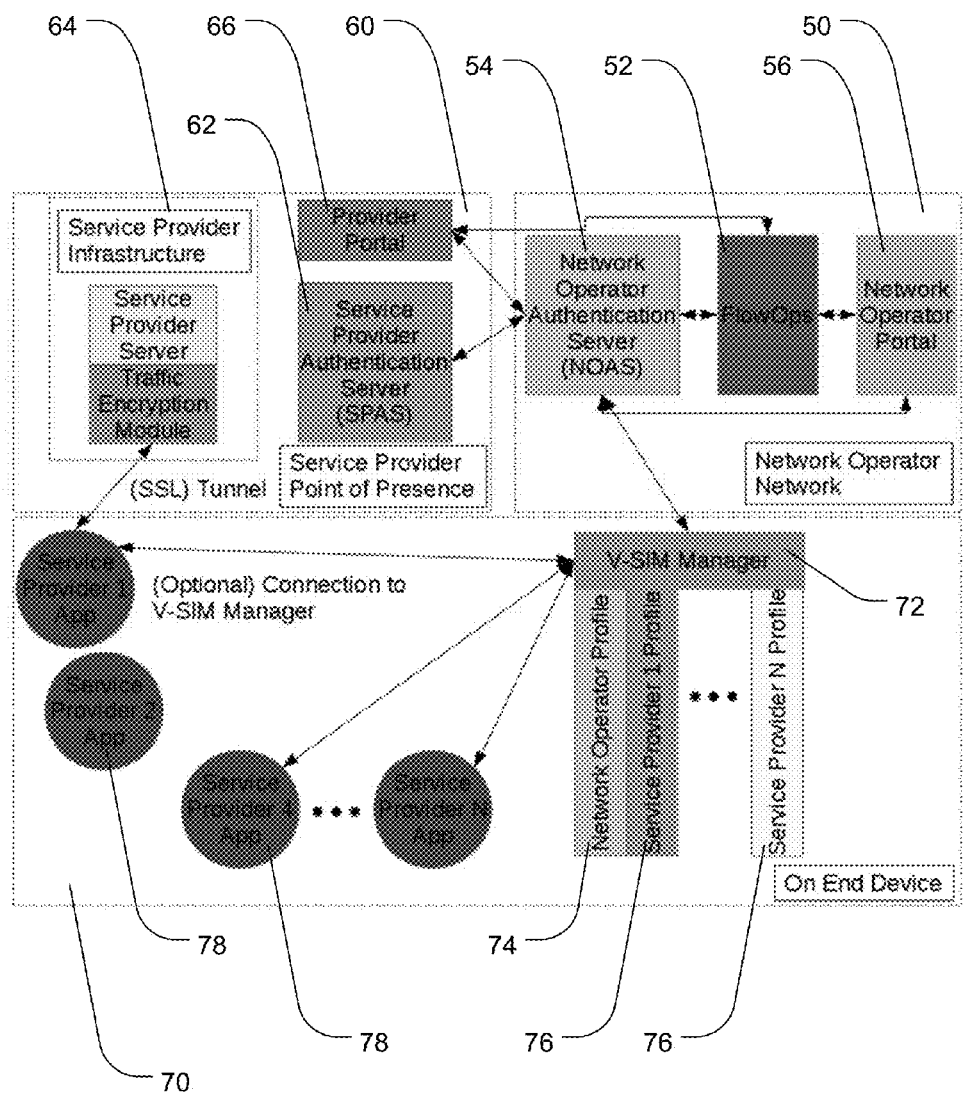
FIG. 4 shows a logical depiction of a network authentication system architecture.

To better understand embodiments of the invention, an exemplary embodiment of a logical structure of a networked system providing features in accordance with embodiments of the invention is illustrated in FIG. 4. In the exemplary configuration, components of the system are divided among the various participants. Certain components are provided by the network operator 50. First, the network operator 50 provides a network framework, as discussed above, providing certain network management services, which is illustrated as FlowOps 52. The network operator also provides a network operator authentication server (NOAS) 54, which provides authentication services between the service provider and the subscriber. The network operator also provides a network operator portal 56, which allows a new user to sign up for service and get a necessary virtual subscriber ID manager (V-SIM) and network operator profile.

Also illustrated in FIG. 4 is a service provider network 60, which includes various components supplied by the service provider. The service provider network 60 includes a service provider authentication server (SPAS) 62, which stores subscriber information for the service and provides information to the NOAS 54 for authentication procedures as discussed in more detail below. The service provider network 60 may optionally include a variety of service provider infrastructure 64 adapted to provide services to the subscriber. The service provider infrastructure 64 may include a variety of equipment such as one or more service provider servers, traffic encryption modules, and the like, and such infrastructure 64 is used in the provision of services to the subscriber once an authentication procedure has been completed and a logical network established between the service provider and the subscriber. The service provider network 60 also includes a provider portal that allows a new user to sign up for service and get a necessary V-SIM profile and any service provider apps.

FIG. 4 also illustrates an exemplary end device 70, which is communicatively connected to the network operator's network, and is initially assigned to the network operator's bootstrapping network, pending completion of an authentication procedure and/or a sign-up process as discussed in more detail below. The end device 70 could be a user device (e.g., a laptop, desktop, television, VoIP telephone, router), an optical network terminal (ONT), or a hybrid device such as an emergency services device. Using a user's device as the end device 70 allows a user's services to be available while the end device 70 is at different locations. This allows the best overall end-to-end security solution and can be considered trusted by the user. Using an ONT as the end device allows ease of setup and control as it is set up by the network operator 50. However, since the ONT commonly resides physically out of the control of the user, the network operator 50, and the service providers, it is much more susceptible to being compromised.

As illustrated in FIG. 4, the end device 70 includes a V-SIM manager 72, which stores subscriber information and authenticates through the NOAS 54 using one or more V-SIMs. The V-SIMs are stored as profiles, such as a network operator profile 74 and one or more service provider profiles 76. The network operator 50 provides the network operator profile 74, and the various service providers provide the service provider profiles 76.

The end device 70 may optionally also include one or more service provider apps 78. Each service provider app 78 may set up special connections between the end device 70 and the service provider network 60. Service provider apps 78 may also provide their own authentication mechanisms between the end user and the service provider.

Figure 5:
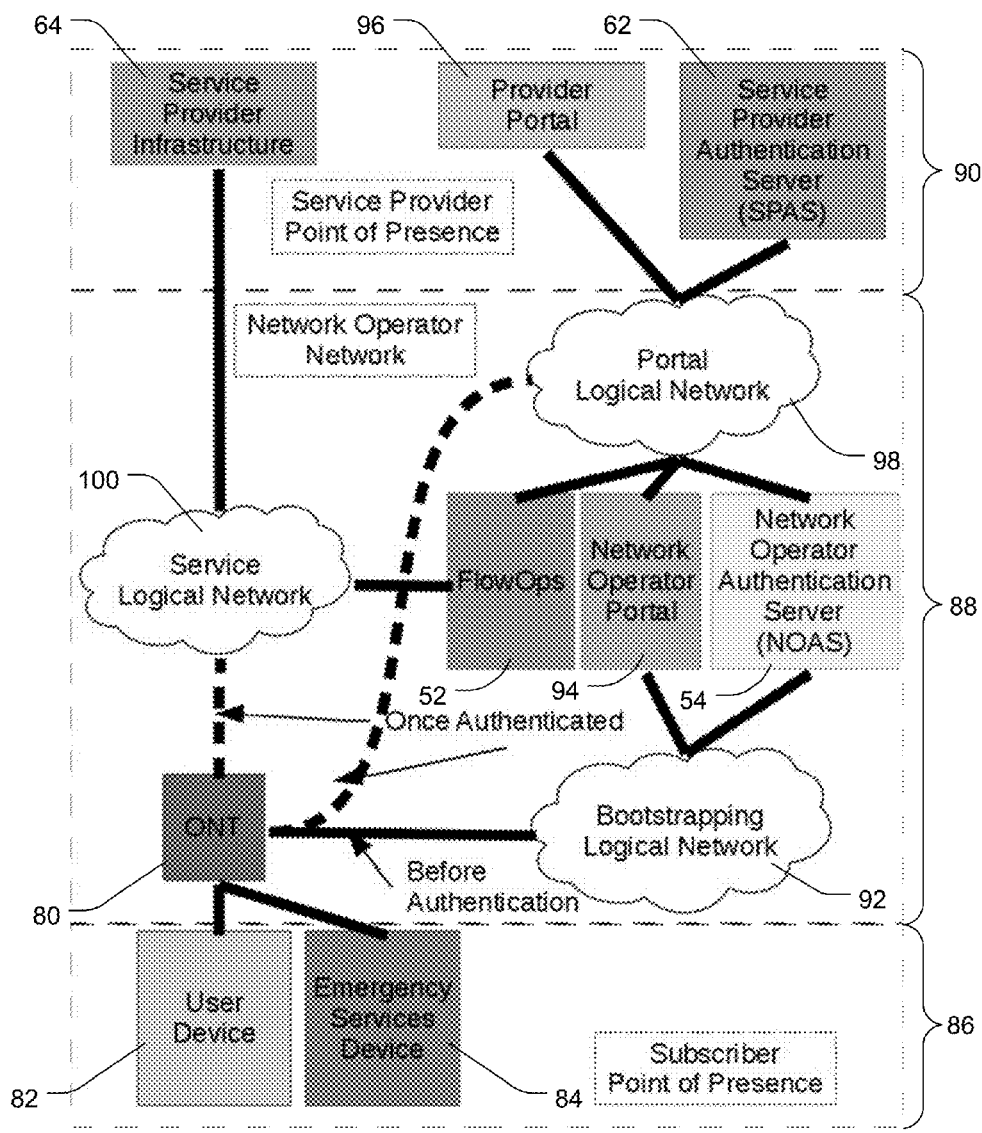
FIG. 5 shows a depiction of one way of implementing the architecture of FIG. 4 on an open access network.

FIG. 5 illustrates how the logical network architecture shown in FIG. 4 may be mapped to the network operator's physical network as well as the logical networks that may be established and used before, during, and after authentication. It should be understood that the architecture and structure shown in FIGS. 4 and 5 is intended only to illustrate and facilitate disclosure and description of embodiments of the invention, not to be an exhaustive description of all network components. It is anticipated that one of ordinary skill in the art using this disclosure will understand how to implement the embodiments of the invention using current and future networking components regardless of whether or not each individual component is specifically described.

In the illustration of FIG. 5, the end point (the end device 70) can be located at different locations in the diagram, namely on an ONT 80, on a user device 82, or as a part of an emergency services device 84. This allows maximum flexibility in the capabilities of the system. These end devices could work together to set up the various services at a location. FIG. 5 also illustrates division of control of the network components between a subscriber point of presence 86, a network operator network 88, and a service provider point of presence 90.

Where the user device 82 is used as the end device, the greatest mobility and end-to-end security option is allowed. In this scenario, whenever the user would connect to the network, the V-SIM manager 72 on the user device 82 would be used to authenticate the subscriber and start the connection set up process. (Other device elements, such as a device manager, could be used to provide the function of the V-SIM manager 72 in other examples.) In one example, only one service provider could be used at a time since FlowOps 52 routes a service to a port. In another example, multiple service providers could be set up on the user device 82. Unlike in the other two scenarios (ONT 80 as end device or emergency services device 84 as end device), the software would be on a device maintained by the subscriber. This also provides a security aspect since nothing would be installed on the ONT 80. All the security information still stays between the real subscriber and the service provider. Service provider apps 78 could take the form of either the smart phone app model (as described later) or the tunnel client model (also as described later) in this scenario.

In what may be a most common scenario, the ONT 80 is used as the end device. In this case, the V-SIM manager 72 would run on the ONT 80 and be run upon connection. The software could be transferred if the subscriber moves to a location using a different ONT 80. In this scenario the tunnel client model of service provider apps could be used. This would provide traffic manipulation to traffic destined to a specific service. The advantage of this approach is that no modifications would be required to user devices 82, as all changes occur in the ONT 80 itself.

As a middle-ground example, the emergency services device 84 may be used as the end device. In this case, though the emergency services device 84 is physically located at the subscriber point of presence 86, the device 84 would most likely be maintained by the network operator, similar to an ONT 80. The emergency services device 84 would also have an interface accessible by the user, similar to the user device 82. The emergency services would be separated on the device 84, but would be sent over a single interface. Service provider apps could take the form of either the smart phone app model or the tunnel client model in this scenario.

Regardless of the device used as the end device, when a brand new user connects, the user is connected via a bootstrapping logical network 92 as illustrated. The bootstrapping logical network 92 is limited in the resources available to the user, as authentication has not occurred. While existing users are able to authenticate to the network operator and one or more service providers, new users are initially redirected to a network operator portal 94 provided by the network operator. There the new user creates an account with the network operator. Once an account has been created, the subscriber receives the V-SIM manager 72 software with the network operator profile 74 and is authenticated by the network operator. If the user uses other devices to connect to the network operator and/or service providers, a similar or modified setup may be provided by which other devices may obtain the V-SIM manager 72 software and network operator profile 74, whether copies of previously distributed software or device-specific versions thereof. Alternatively, a device may have the V-SIM manager 72 software and network operator profile 74 pre-installed prior to purchase of the device.

Then the user is able to access any available service provider portals 96, using a portal logical network 98. These service provider portals 96 allow a user to subscribe to the associated service. Once the user is subscribed to a service, the service provider gives the subscriber the V-SIM service provider profile 76 for that service to be added to the V-SIM manager 72. Those profiles 76 are then used for normal authentication and returning users. All V-SIM profiles 74, 76 are transferred using secure connections. Services are provided to users using service logical networks 100 that are established after user authentication has occurred with the service providers.

Service support can vary from having one service per port (in the case of the end device being an ONT 80) to multiple services running on a user device 82. Services themselves can vary greatly from having no infrastructure of their own as could be the case in a peer-to-peer type service or can have more extensive infrastructure, such as might be typical with services such as video streaming services.

Service providers can develop apps to run on the end device. These apps allow the service provider to work with the traffic between the device and the service provider. In theory, such an app could communicate with the NOAS 54 directly, bypassing the need for that service provider to provide a V-SIM profile 76 for the V-SIM manager 72.

Figure 6:
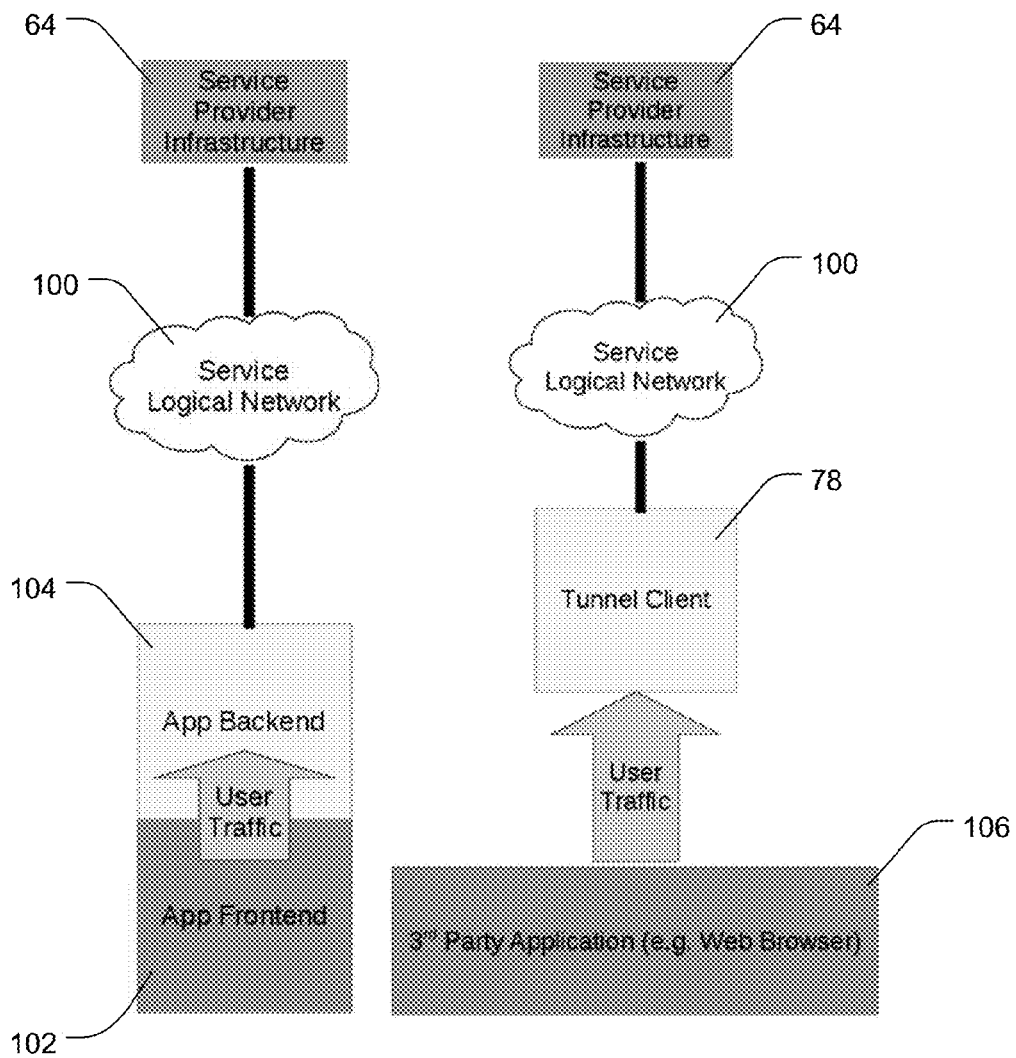
FIG. 6 shows various service provider app models.

There are several app models that may be used by the service provider apps 78. A first app model that could be used is a smart phone app model, which is illustrated in the left side of FIG. 6. This portion of FIG. 6 shows a communication path for a service provider app 78 using the smart phone app model. In this model, the app 78 consists of two parts, a frontend 102 which is used by the user and a backend 104 that handles communicating with the service provider infrastructure 64.

A second app model that could be used is a tunnel client app model, which is illustrated in the right side of FIG. 6. This portion of FIG. 6 shows a communication path for a service provider app 78 using the tunnel client app model. This model works similar to a virtual private network (VPN) client. Traffic from third-party software 106, such as a web browser, gets automatically routed through the service provider app 78. The idea behind this model is that third-party software 106 can be used without modification.

Figure 7:
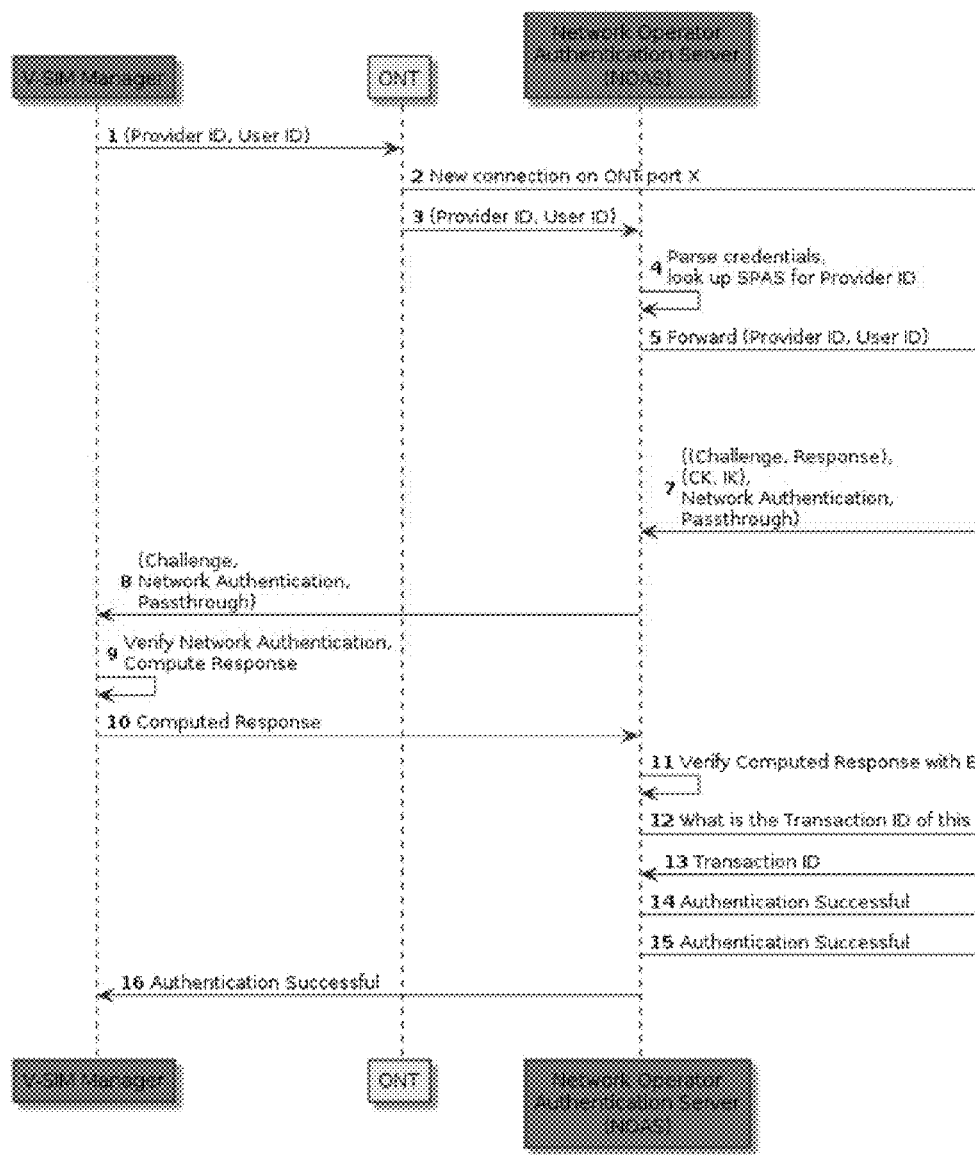
FIGS. 7-8 illustrate a protocol for use with embodiments of the invention.
Figure 8:
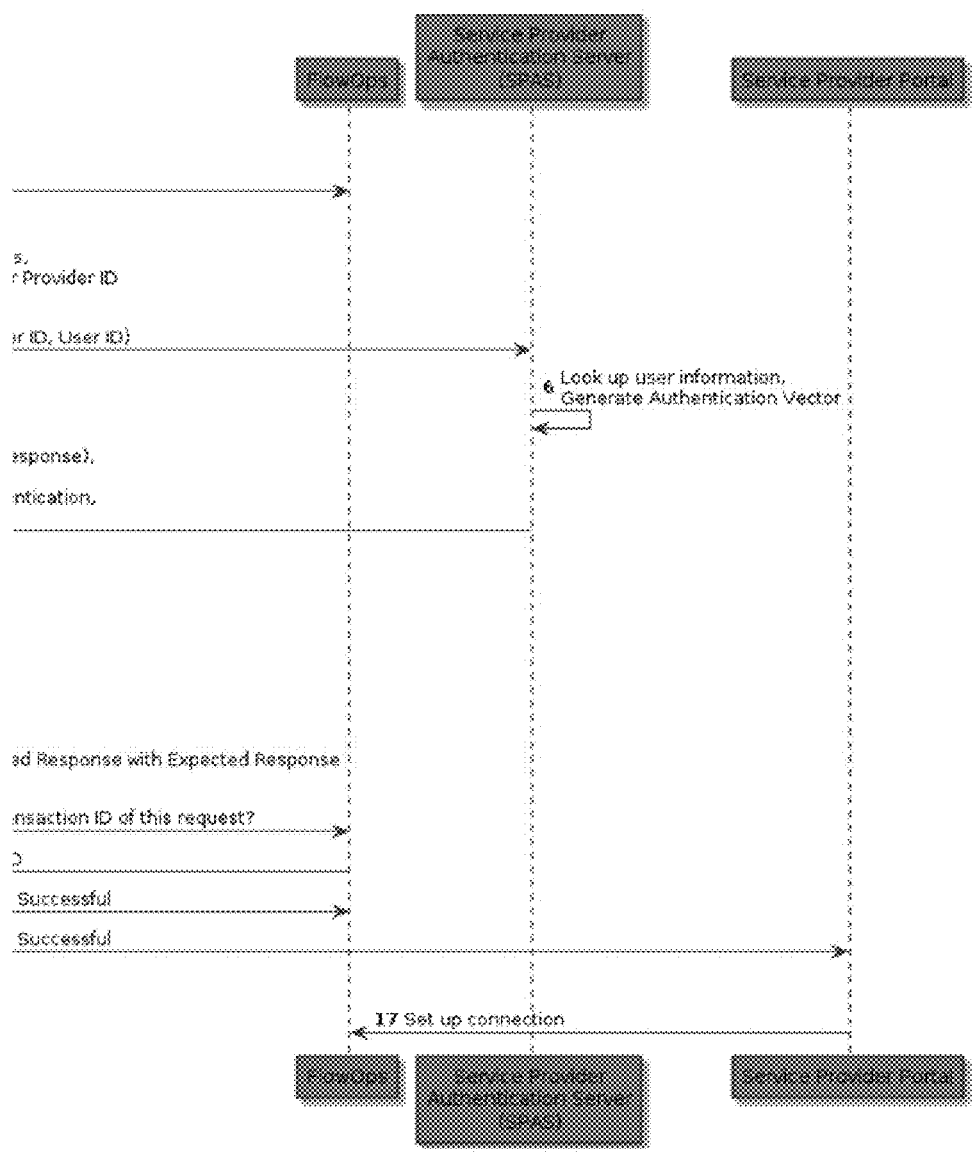

Embodiments of the invention provide an authentication procedure utilizing a shared secret between the user and the service provider. FIGS. 7 and 8 (which join to form a unitary diagram) illustrate an exemplary protocol sequence. At step 1, the V-SIM manager 72 (e.g., on the user device 82) sends credentials (e.g., a provider ID and a user ID) to the NOAS 54. The user's ONT 80 detects the packet and, at step 2, sends port information to FlowOps 52 needed for setting up the connection. At step 3, the ONT 80 then forwards the packet to the NOAS 54. At step 4, the NOAS 54 parses the credentials to extract the provider ID and looks up the server associated with that provider ID. At step 5, the NOAS forwards the credentials to the SPAS 62.

The SPAS 62, at step 6, generates a random number and uses that to generate an authentication vector. This vector consists of a subscriber authentication (challenge and response), encryption key (CK), integrity key (IK), network authentication, and passthrough components. This vector is sent back to the NOAS 54 at step 7.

The NOAS 54 splits the subscriber authentication part of the authentication vector into the challenge and response. Then, at step 8, the NOAS 54 forwards the challenge and unmodified network authentication and passthrough components to the V-SIM manager 72 on the user's end device. The V-SIM manager 72 uses the appropriate V-SIM to authenticate the network using the network authentication component and generates a response at step 9. At step 10, the V-SIM manager sends the computed response to the NOAS 54.

The NOAS 54 compares the response received from the V-SIM manager 72 to the response part of the original authentication vector at step 11. If the responses match, the end device is considered authenticated. (If the responses don't match, the end device is not authenticated, and the process terminates with or without notification to the user.) Assuming authentication is successful, the NOAS 54, at step 12, sends a request to FlowOps 52 for the transaction ID for the connection to send to the service provider portal 96.

At step 13, FlowOps 52 returns the Transaction ID to the NOAS 54. Once the user/session is authenticated, the NOAS 54 sends a message notifying FlowOps 52 that an end device has successfully authenticated for a particular service at step 14. At step 15, the NOAS 54 also sends a message notifying the Service Provider of a successful authentication with the transaction ID needed to finish setting up the connection. A message is also sent to the V-SIM manager of a successful authentication at step 16. At step 17, the Service Provider then contacts FlowOps 52 with instructions to complete setting up the connection, and FlowOps 52 proceeds to establish the service logical network 100, such as according to principals and procedures discussed in the related application.

Authentication procedures such as those described with respect to FIGS. 7 and 8 protect against many of the ways in which adversaries might seek unauthorized use of network operator infrastructure and bandwidth and/or service provider services. For example, an adversary wishing to use unpaid infrastructure and bandwidth of the network operator initially only has access to the bootstrapping logical network 92 and the network operator portal 94. Because the adversary is not using or behind an end device that has already been authenticated by the network operator and does not have access to valid credentials for the network operator, the adversary cannot access further resources. The system prevents further access by requiring users to authenticate using a shared secret before access is granted to a network other than the bootstrapping logical network 92.

Similarly, if the adversary wishes to use services that have not been subscribed to or subscribed services at an unauthorized location, the authentication procedures will prevent such illicit services use. Again, in the absence of use of an end device authenticated by the network operator, the adversary is prevented from accessing more than the bootstrapping logical network 92 and the network operator portal 94. The network operator and/or the service provider, being aware of the location of attempted access to services, can prevent access to services at unauthorized locations.

An adversary might seek to place itself between the subscriber and the service provider, such as through a compromised ONT 80. In this way, the adversary would seek to take advantage of the fact the user's device and the service provider are trusted so as to intercept credentials and/or data using untrusted hardware. Because of the shared secret between the service provider and the end user, however, intermediary networks can authenticate the subscriber while having no knowledge of the shared secret. During authentication, the secret remains between the service provider and the subscriber, with intermediary notes only being able to access the challenge and the expected response of the authentication vector. Once authentication is successful, the service provider app 78 can be used on the user's device to encrypt traffic between the subscriber and the service provider.

If an adversary seeks to pose as an authentication server between the user and the service provider, the adversary will still fail to obtain sufficient information to steal network resources, bandwidth, and/or services. Authentication will typically occur over a secure connection (e.g., secure sockets layer (SSL) or transport layer security (TLS)). The adversary might attempt to mimic the functionality of an authentication server (NOAS 45 or SPAS 62). Communication between the user's V-SIM manager 72 and the rogue authentication server would only occur if the rogue authentication server was able to produce a certificate that is considered valid by the user's V-SIM manager. The adversary would lack the proper challenge necessary to elicit a response from the V-SIM manager 72.

Denial of service (DoS) is one goal of some adversaries. Authentication is required to access network operator/service provider resources other than the bootstrapping logical network 92, so DoS can be reduced to only coming from authenticated devices. Since the network architecture is broken into multiple logical networks, traffic can be filtered by the network it comes from, reducing the ability of the adversary to carry out a successful DoS attack. If a DoS attack does take place on a network, it is isolated to that particular logical network and the network operator has enough knowledge to mitigate the attack.

As with any network system, an adversary might seek to compromise a connected system (an authenticated system). Traditional protections will minimize this risk: firewalls, strong passwords, specific logical network topologies (i.e., E-Line and E-Tree), etc. can reduce the risk of a system being compromised. If the ONT 80 is the end point and is changed by an adversary, the credentials would remain on the old ONT 80 and would not apply to the new device. Since the new ONT 80 would not have the credentials, it would not be able to authenticate with the network. If the ONT 80 is the end point and becomes compromised, credentials most likely would be compromised. When credentials are compromised, they would have to be regenerated (i.e., generate a new secret key). A compromised ONT 80 only affects traffic "below" the ONT (i.e., away from the core of the network operator) since traffic sent towards the core of the network would be filtered. Once an ONT 80 is determined to be compromised, the network operator deactivates the link to that particular ONT 80 in the network.

Systems and methods according to embodiments of the invention also provide additional benefits beyond security benefits. Specifically, one benefit that may be provided is mobility of services to other devices, to other in-network locations, and to locations served by other network operators.

Agreements can be made between network operators to allow users of one network operator (e.g., a home network operator) to use the network of a different network operator (e.g., a visiting network operator). For example, a user of one network operator could allow users of another network operator to have some basic level of service for free. When the V-SIM manager 72 sends the credentials of the home network operator to the NOAS 54 of the visiting network, the NOAS 54 of the visiting network contacts the NOAS 54 of the home network to authenticate the user using a protocol similar to that described with respect to FIGS. 7-8. Authentication could then continue for services that are available on both networks.

Similarly, if a user is authorized to use services at different locations on a network operator's network, the user can transfer services within the network operator's network by simply moving the end device to a new location and authenticating using the V-SIM manager 72. During the authentication process, the services are then set up at the new location.

A user might be allowed to (temporarily) use their services at another location within the network operator's network (for example visiting a coffee shop or visiting a friend). The user visiting would authenticate normally using the procedures of FIGS. 7-8 or similar procedures, and services could either be temporarily moved (i.e., temporarily cut off service at the normal location and make it available at their current location) or services could temporarily be available at both locations (i.e., at home and at the current location).

Figure 9:
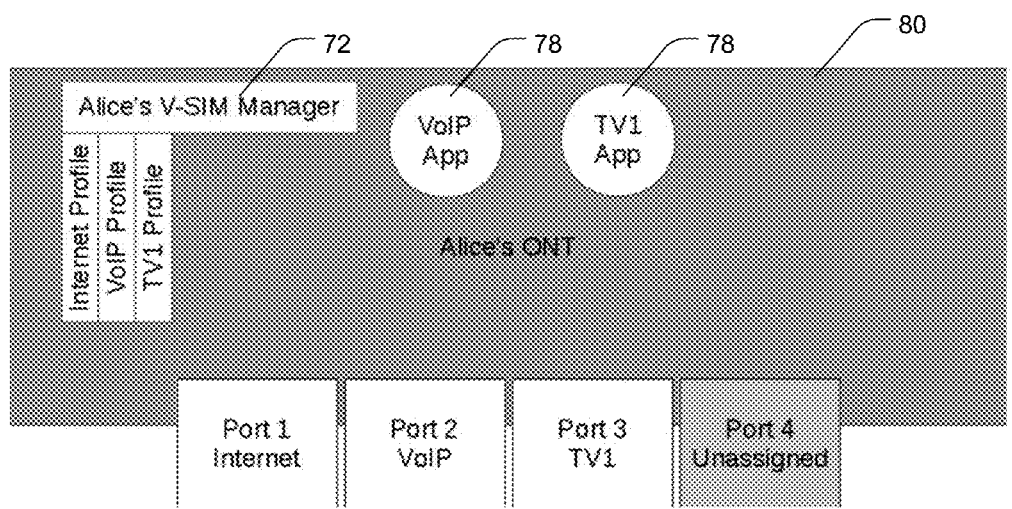
FIGS. 9-10 illustrate authentication of a guest device to provide mobility of services on an open access network.
Figure 10:
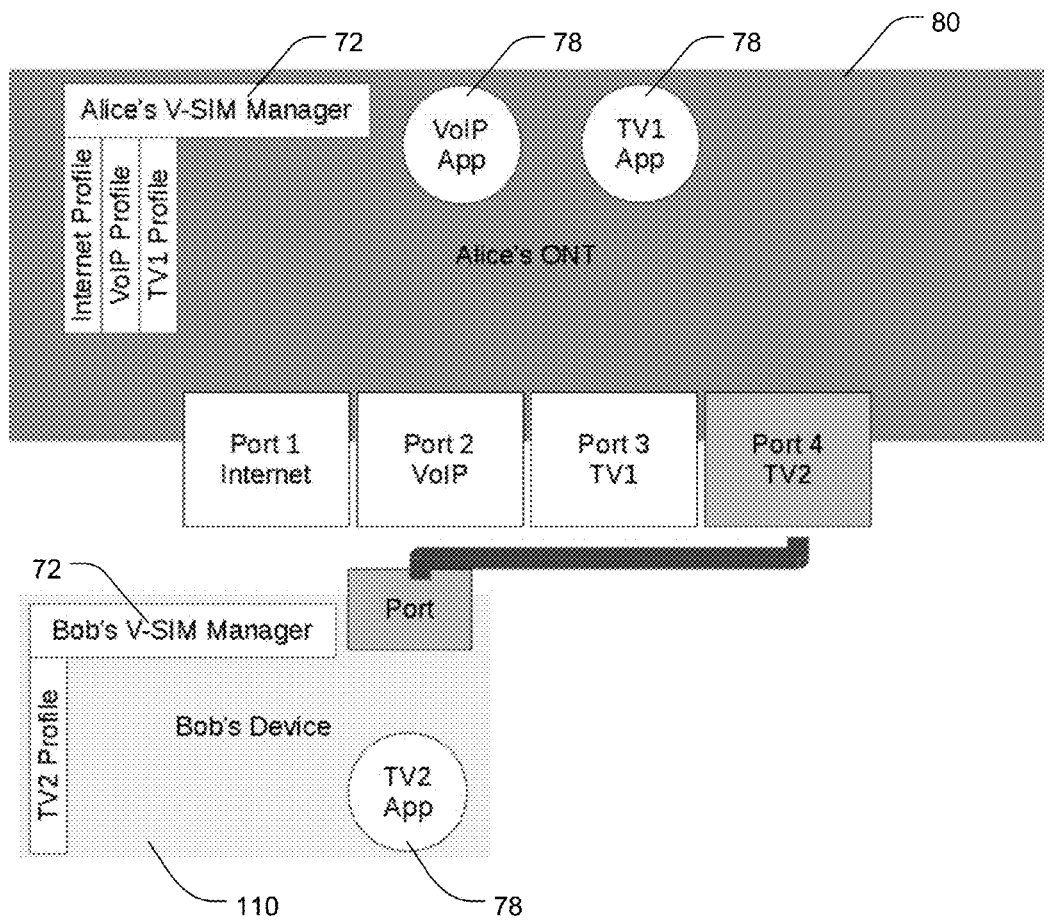

FIGS. 9 and 10 illustrate one example of mobility of services. In this example, there are two subscribers of the same network operator, Alice and Bob, who are friends. Alice subscribes to the following services: Internet, VoIP, and TV1. This setup can be seen in FIG. 9. Alice's V-SIM manager 72 and the associated service provider apps 78 are running on Alice's ONT 80. Port 4 on the ONT 80 is currently unused.

Bob is visiting Alice and wants to use his TV2 subscription while visiting Alice. Bob's device 110 is running Bob's V-SIM manager 72 with the profile for Bob's TV2 subscription as well as the associated service provider app 78 for TV2 (assuming TV2 has an app 78). As shown in FIG. 10, Bob connects his device 110 to Port 4 on Alice's ONT 80. Assuming the TV2 service provider will allow Bob's device 110 to authenticate (based on mobility agreements, etc.), Bob's device 110 authenticates to the network and the TV2 service can be used using the credentials on his device 110.

Alice and Bob are now able to use the TV2 service on Bob's device 110. Note that no additional components are installed on Alice's ONT 80 and that Ports 1-3 on Alice's ONT 80 are left unchanged. Once Bob disconnects his device 110, Alice's ONT 80 will no longer be able to receive TV2 service since authentication will fail.

User's V-SIM profiles could also be used to authenticate a user of one service with another service. For example, if a news organization provides content only if a user subscribes to another service, such as an IPTv service, the credentials for the IPTv service can be sent to the authentication server for the news organization. Then a protocol similar to the one described with respect to FIGS. 7-8 can be used to complete the set up process.

Figure 11:
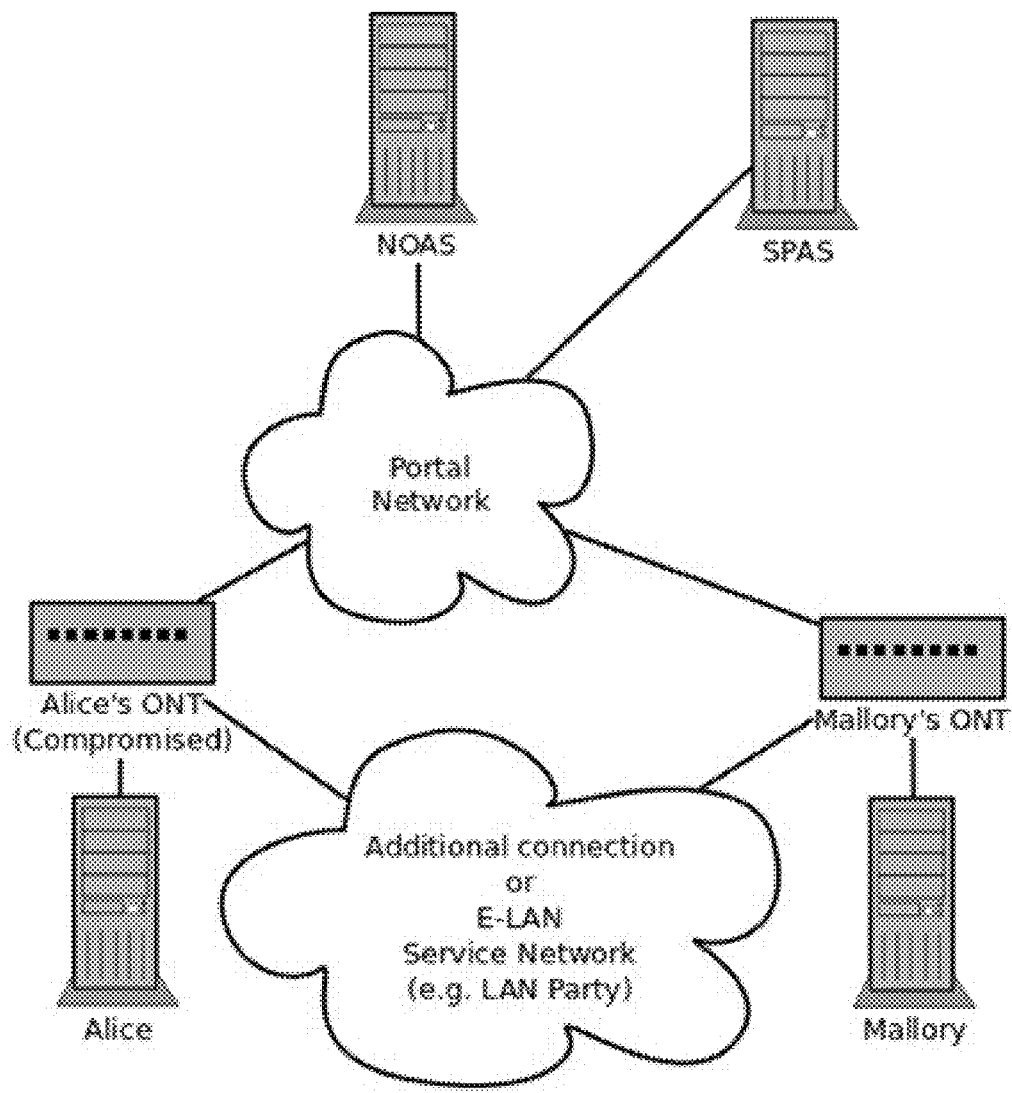
FIG. 11 shows a networked system incorporating a compromised optical network terminal.
Figure 12:
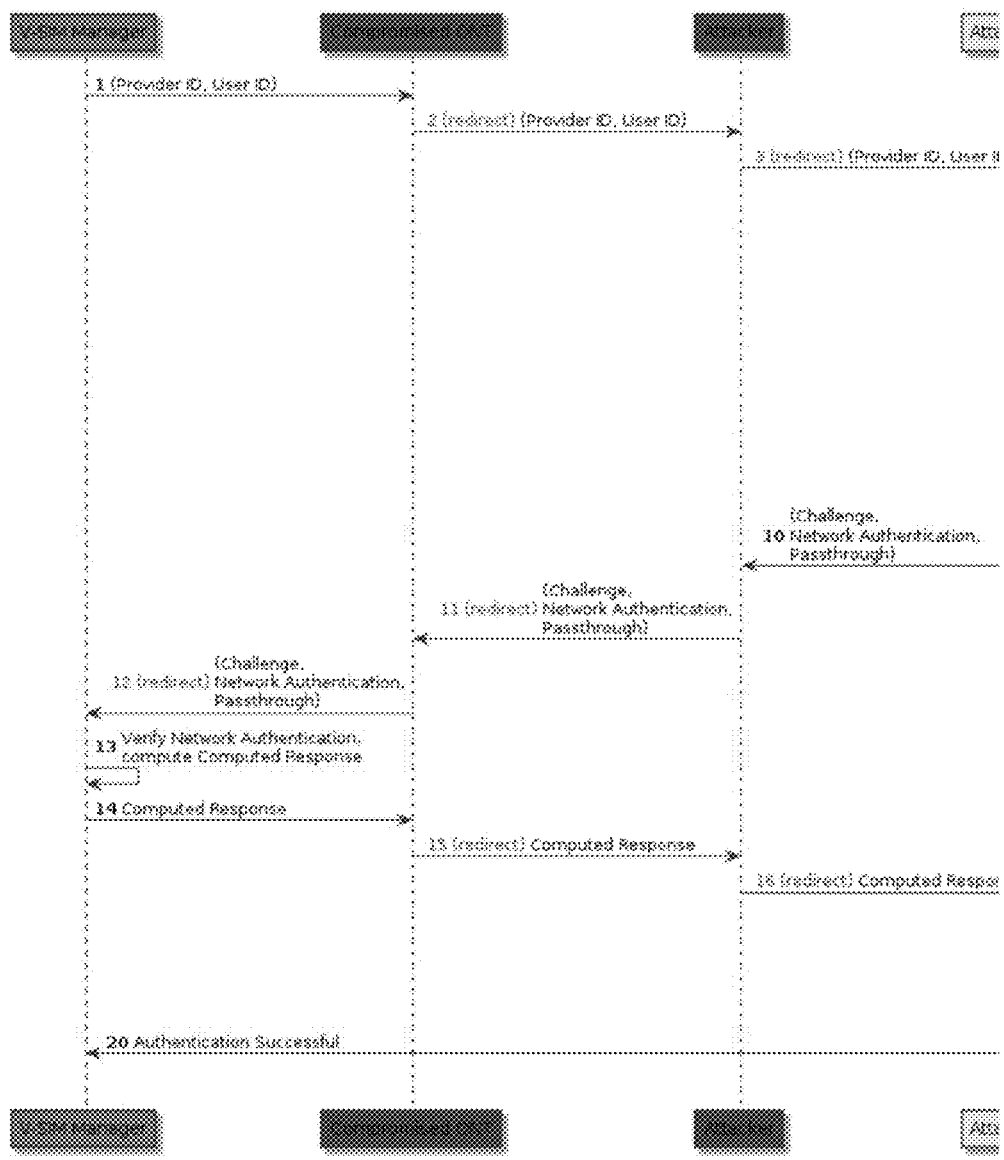
FIGS. 12-14 illustrate an authentication protocol that might be used when an optical network terminal has been compromised.
Figure 13:
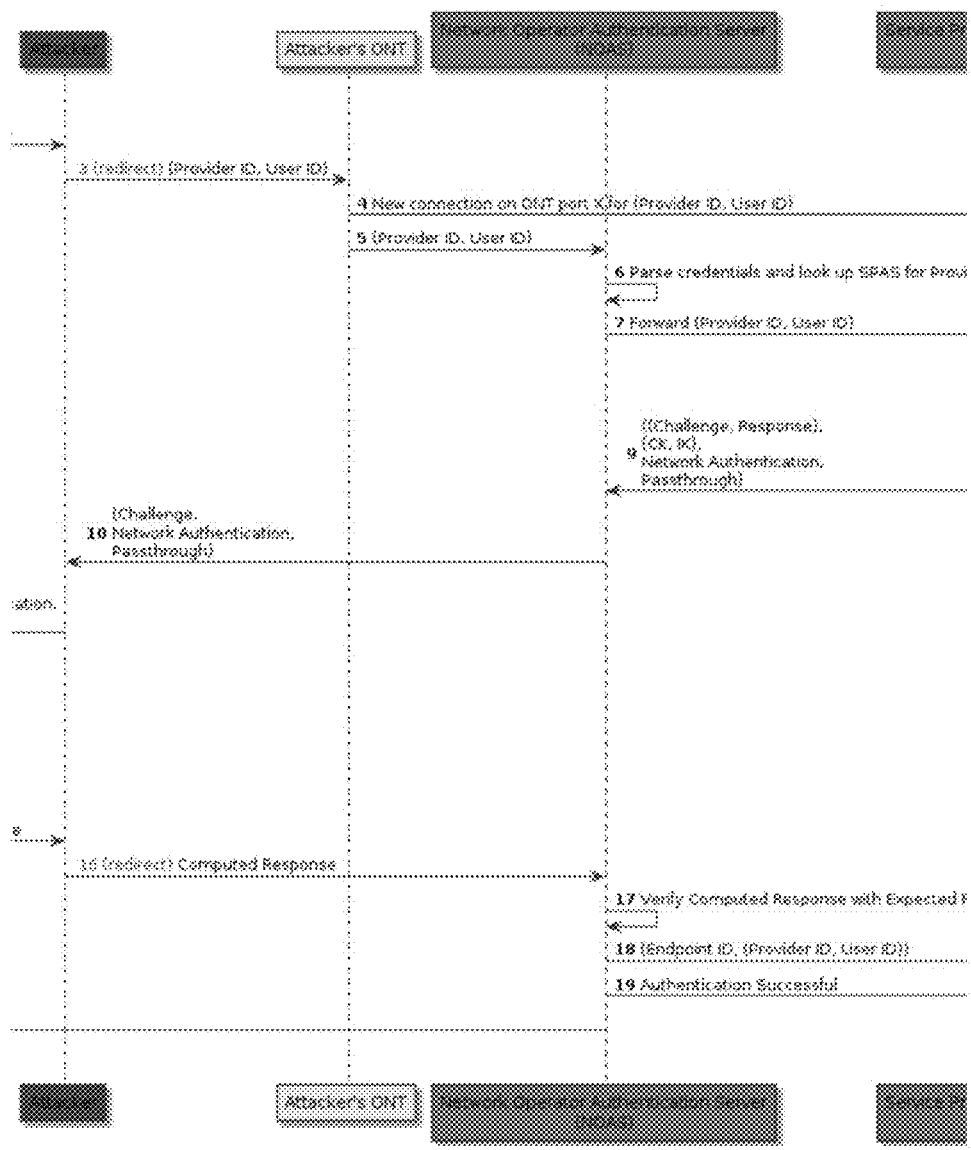
Figure 14:
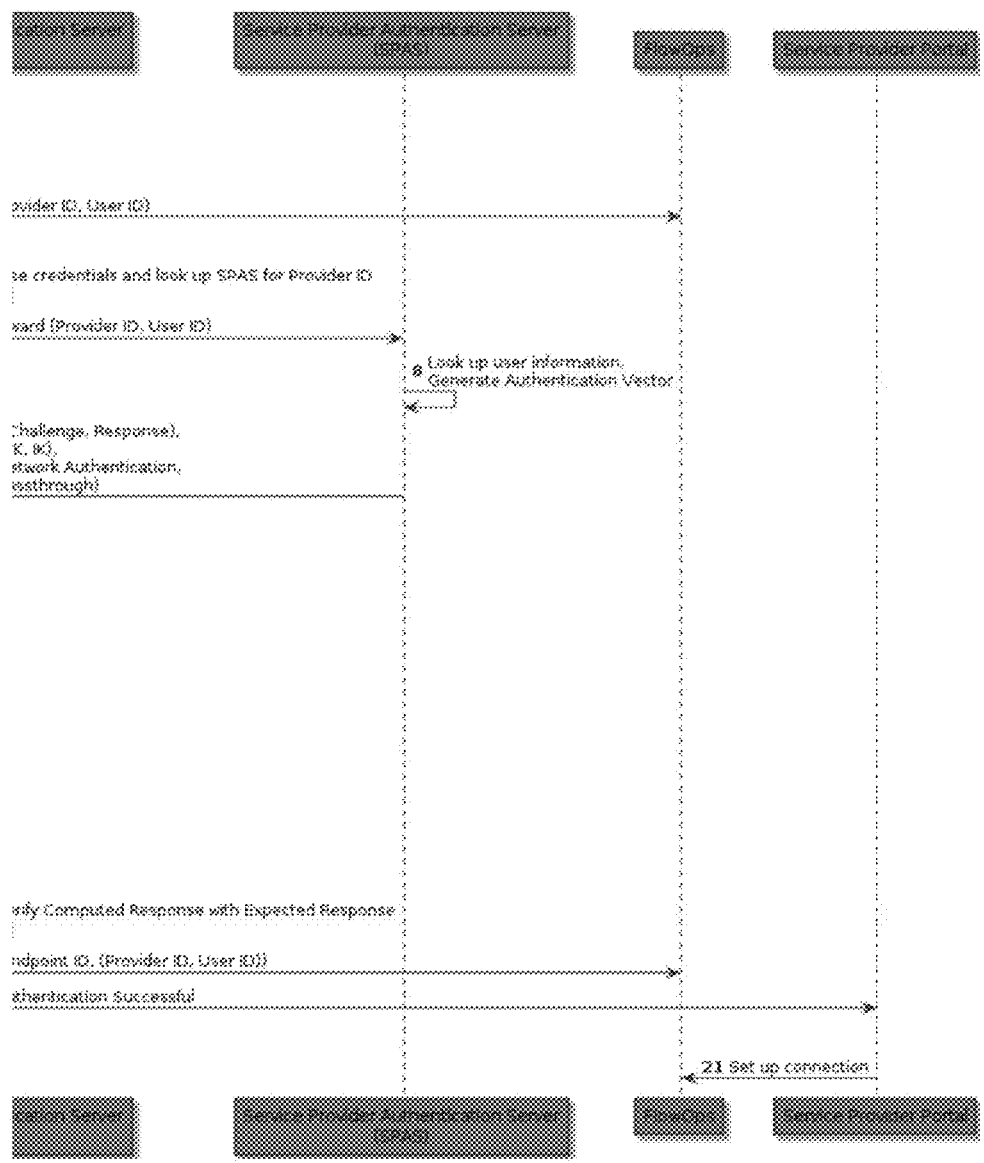

Introducing mobility allows for a person-in-the-middle/redirection attack as outlined in FIGS. 11-14. FIGS. 12-14 illustrate steps of an authentication procedure similar to that of FIGS. 7-8 with an inserted attacker, and FIGS. 12-14 are intended to be joined together to illustrate a unitary procedure. If an attacker is able to compromise a node between the user's device and the NOAS 84 (e.g., a compromised ONT 80, as shown in FIG. 11), then the attacker could modify the flow of the protocol over an alternate channel, either a covert channel using another service shared by the user and the attack (such as a peer-to-peer service) or using another link (such as a wireless adapter attached to the ONT 80).

FIGS. 12-14 provide the protocol sequence during the attack with differences highlighted. When the V-SIM manager 72 sends the credential packet at step 1, the compromised ONT 80 would forward that packet to the attacker over the covert channel or alternate connection at step 2. The attacker would then send the packet to the attacker's ONT 80 at step 3, and the attacker's ONT would process the packet normally as if it came from the attacker originally at step 4. Normal processing of the packet would continue until the challenge packet came back to the attacker (steps 4-10). The attacker would then forward the challenge to the original V-SIM manager 72 over the alternate channel (steps 11-12) and the V-SIM manager 72 would process the packet normally at step 13. Since the packet was unaltered, it would pass checks run by the V-SIM manager 72 and a response would be sent at step 14. Again, at step 15, the compromised ONT 80 sends the response over the alternate channel to the attacker and, at step 16, the attacker transmits the response to the NOAS 54. At this point, the NOAS 54 verifies the response against the expected response at step 17, and the authentication is considered successful. The result of this attack is that FlowOps 52 will set up the service connection between the attacker and the service rather than the user and the service (steps 18-21).

This attack will have no effect if the traffic between the user and the service provider is encrypted using a shared secret since the attacker would not know the key needed to communicate further with the service provider. If the traffic between the service provider and user is not protected after the authentication takes place, protecting the authentication itself will have no effect, as the rest of the session could be redirected to the attacker.

The V-SIM manager 72 of the user device(s) may store a variety of virtual SIM profiles, allowing each user device capable of receiving more than one service to establish a service logical network 98 with a variety of service providers. Thus, the use of the V-SIM manager 72 and the service provider profiles 76 allows for fine-grained authentication on a service-by-service basis, rather than on an all-or-none basis as is typical with past systems. The V-SIM manager 72 may utilize a trusted platform module (TPM), and it may be noted that the authentication protocols discussed herein are generally based on the universal mobile telecommunications system (UMTS). A secret is shared between the service provider and the subscriber, and intermediary networks can authenticate the subscriber while having no knowledge of the shared secret.

Figure 15:
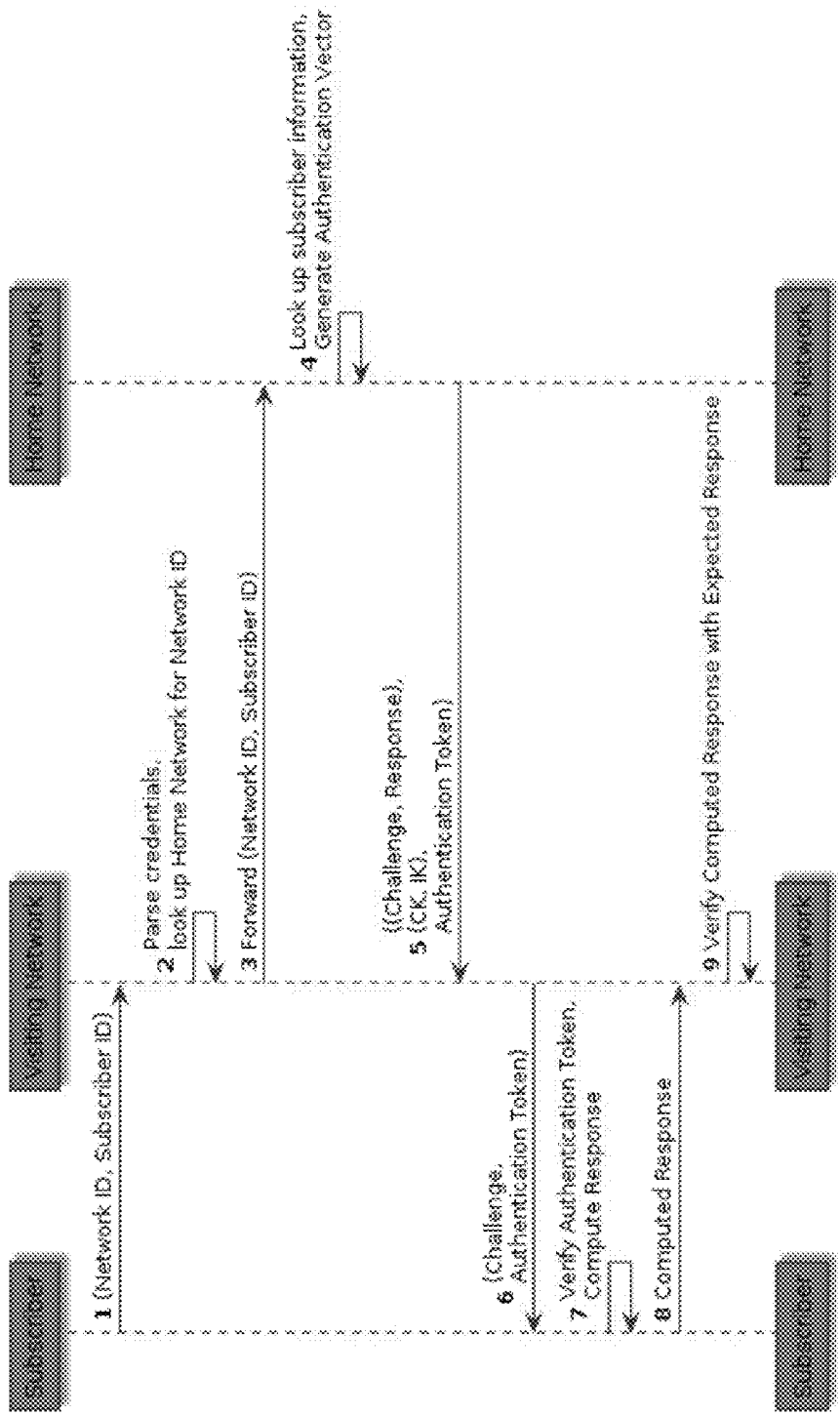
FIG. 15 illustrates an illustrative universal mobile telecommunications system authentication procedure.

FIG. 15 shows a sequence diagram for an illustrative UMTS authentication procedure. This is a protocol that resembles the protocol of FIGS. 7-8, and appears to be a simplified version of the protocol of FIGS. 7-8. The protocol of FIG. 15, however, varies from the approach of FIGS. 7-8 in several key ways. Unlike in UMTS, the service provider has to contact the network operator to set up the final connection. The network operator acts as a proxy for authentication to allow it to gather necessary information to pass along to the service provider in the form of a transaction ID.

Furthermore, additional information is gathered in the protocol for use by the network operator (e.g. location information from the ONT 80). Normal communication is intended to be between the end user and the network operator rather than between the end user and the service provider. In the novel protocol, the network operator provides the physical infrastructure, while the service provider still provides the actual service.

Figure 16:
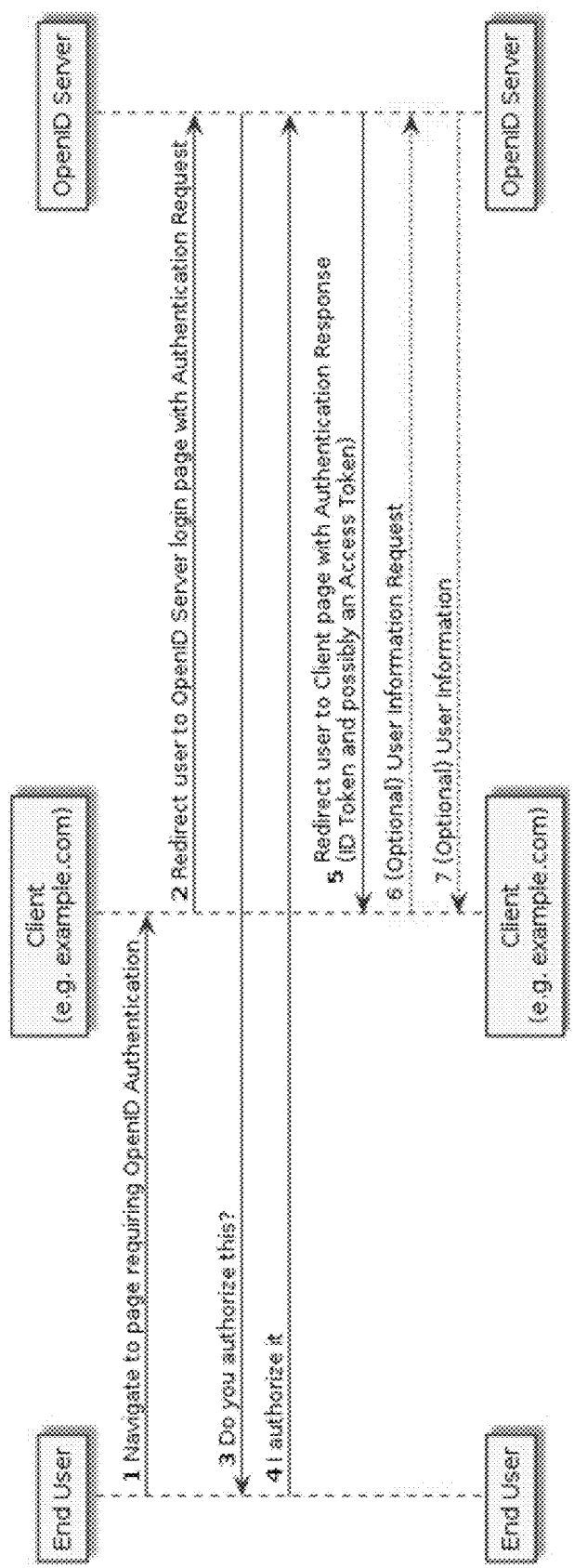
FIG. 16 illustrates an illustrative OpenID authentication procedure.

FIG. 16 shows a sequence diagram for an illustrative OpenID authentication procedure. The latest version of OpenID, OpenID Connect, is built on top of OAuth 2.0. The basic sequence in this example of OpenID begins at step 1 with the user contacting the client (roughly analogous to the network operator) with the desire to use client resources. The client sends an authentication request to the OpenID server to verify the identity of the user at step 2. At step 3, the OpenID server contacts the user's device to require proof of identity and authorization to release information. The user authenticates and authorizes the release of information at step 4.

The OpenID server sends an ID token (and possibly an access token) to the client to prove authentication and authorization at step 5. At step 6 and if an access token was provided, the client requests user information from the OpenID server, which is delivered, if authorized, at step 7.

This sequence differs from the sequence illustrated in FIGS. 7-8 in several important ways. First, normal authentication communication is intended to be between the user and the network operator, rather than between the user and the service provider (analogous to the OpenID server of FIG. 16). Second, the user must be aware of details for both the client (analogous to the network operator) and the OpenID server (analogous to the service provider) (i.e. it has to directly interact with both during the protocol), whereas in the authentication protocol of FIGS. 7-8, the V-SIM manager 72 only directly interacts with the network operator.

In the OpenID scheme, the client (analogous to the network operator) needs to know more information about the end user device (analogous to the V-SIM manager). In contrast, in the protocol of FIGS. 7-8, the network operator acts as simply a proxy passing messages back until a simple binary comparison of the response and expected response is required.

Also, by using the network operator as a proxy, more information hiding of the network operator's network can occur since no internal information needs to be given to either the V-SIM manager 72 or the service provider. Upon successful authentication, the network operator provides the service provider with a transaction ID that can be used to complete the process.

While the foregoing description has focused on applicability of embodiments of the invention to open access networks with specific examples of government- or municipality-provided networks, it should be understood that embodiments of the invention embrace use with any kind of network. For example, it is anticipated that embodiments of the invention will allow cell phones and other mobile devices to provide service-specific authentication on mobile networks such as cellular networks.

The software-based V-SIMs utilized in accordance with embodiments of the invention provide significant benefits over hardware-based SIMs such as SIM cards that are used in the cellular industry. The software-based V-SIMs are delivered over the network itself on demand, are portable, and multiple V-SIMs can be stored in a single V-SIM manager 72. As the network resources are then assignable on demand with individual logical networks established for each connection/service (as described more fully in the related application), additional security and privacy benefits ensue: there is no sharing of bandwidth and highly secured connections can be established for the provision of services such as home health and the like. Services can also be set up very easily and rapidly with dedicated delivery channels to provide additional functionality on demand for time intervals of any desired length (e.g., the establishment of a LAN party).

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A method, implemented in an open access network, for authenticating an end-user device to receive services provided by a service provider prior to establishing a logical network connection between the end-user device and the service provider over the open access network, comprising:
   receiving, at a network operator authentication server (NOAS), credentials from a virtual subscriber ID manager (V-SIM manager), the credentials including a user ID associated with an end-user device and a provider ID of a first service provider of a plurality of service providers that provide services over the open access network, the credentials being received before a logical network connection exists between the end-user device and the first service provider within the open access network, the credentials representing a request from the end-user device to establish the logical network connection to thereby allow the end-user device to receive services provided by the first service provider via the logical network connection;
   sending the user ID to a service provider authentication server (SPAS) that is associated with the provider ID;
   receiving, at the NOAS, an authentication vector from the SPAS, the authentication vector including a challenge and an expected response;
   forwarding the challenge to the V-SIM manager;
   identifying, by the V-SIM manager, a service provider profile that is associated with the provider ID and employing the service provider profile to generate a response to the challenge;
   receiving, at the NOAS, the response to the challenge and comparing the response to the expected response that was defined in the authentication vector;
   upon determining that the response matches the expected response, obtaining a transaction ID to represent a logical network connection over the open access network; and
   sending the transaction ID to the first service provider to allow the first service provider to request the establishment of the logical network connection between the end-user device and the first service provider such that the logical network connection between the end-user device and the first service provider is not established in the open access network until after the end-user device has been authenticated to receive services provided by the first service provider.

2. The method of claim 1, wherein the V-SIM manager executes on the end-user device.

3. The method of claim 1, wherein the V-SIM manager executes on an optical network terminal to which the end-user device is connected.

4. The method of claim 1, wherein the V-SIM manager executes on an emergency services device to which the end-user device is connected.

5. The method of claim 1, wherein the authentication vector further includes an encryption key, an integrity key, a network authentication component, and a passthrough component.

6. The method of claim 5, wherein the NOAS forwards the network authentication and passthrough components to the V-SIM manager with the challenge.

7. The method of claim 6, wherein the V-SIM manager authenticates with the open access network using the network authentication component.

8. The method of claim 1, wherein obtaining a transaction ID comprises notifying the open access network that the end-user device has been authenticated to access the first service provider.

9. The method of claim 1, further comprising:
   receiving, from the first service provider, the transaction ID; and
   establishing the logical network connection between the end-user device and the first service provider.

10. The method of claim 1, further comprising:
    in response to determining that the response matches the expected response, notifying the V-SIM manager that the end-user device has been authenticated to access the first service provider.

11. The method of claim 1, wherein sending the user ID to a service provider authentication server (SPAS) that is associated with the provider ID comprises determining that the SPAS is part of a separate open access network and sending the user ID to the SPAS via a second NOAS that is part of the separate open access network.

12. The method of claim 1, further comprising:
    sending, to the V-SIM manager, a service provider profile for a second service provider in response to the end-user device subscribing to the second service provider.

13. The method of claim 1, wherein the V-SIM manager is created in response to a user of the end-user device creating an account with the open access network.

14. The method of claim 1, further comprising:
    receiving, at the NOAS, credentials from a service provider application executing on the end-user device, the credentials including the user ID and a second provider ID of a second service provider that provides the service provider application;
    sending the user ID to a second SPAS that is associated with the second provider ID;
    receiving, at the NOAS, a second authentication vector from the second SPAS, the second authentication vector including a second challenge and a second expected response;
    forwarding the second challenge to the service provider application;
    receiving, at the NOAS and from the service provider application, a second response to the second challenge and comparing the second response to the second expected response;
    upon determining that the second response matches the second expected response, obtaining a second transaction ID to represent a second logical network connection over the open access network between the end-user device and the second service provider; and
    sending the second transaction ID to the second service provider to allow the second service provider to request the establishment of the second logical network connection between the end-user device and the second service provider such that the second logical network connection between the end-user device and the second service provider is not established in the open access network until after the end-user device has been authenticated to receive services provided by the second service provider.

15. A system for authenticating an end-user device to receive services provided by a service provider prior to establishing a connection between the end-user device and the service provider over an open access network, comprising:
(1) a network operator authentication server (NOAS) that is configured to:
receive credentials from a virtual subscriber ID manager (V-SIM manager), the credentials including a user ID associated with an end-user device and a provider ID of a particular service provider of a plurality of service providers that provide services over the open access network, the credentials being received before a logical network connection exists between the end-user device and the particular service provider within the open access network, the credentials representing a request from the end-user device to establish the logical network connection to thereby allow the end-user device to receive services provided by the particular service provider via the logical network connection;
send the user ID to a service provider authentication server (SPAS) that is associated with the provider ID;
receive an authentication vector from the SPAS, the authentication vector including a challenge and an expected response; and
forward the challenge to the V-SIM manager; and
(2) the V-SIM manager that is configured to:
identify a service provider profile that is associated with the provider ID and employ the service provider profile to generate a response to the challenge;
wherein, the NOAS is further configured to:
receive the response to the challenge and compare the response to the expected response that was defined in the authentication vector;
upon determining that the response matches the expected response, obtain a transaction ID to represent a logical network connection over the open access network; and
send the transaction ID to the particular service provider to allow the particular service provider to request the establishment of the logical network connection between the end-user device and the particular service provider such that the logical network connection between the end-user device and the particular service provider is not established in the open access network until after the end-user device has been authenticated to receive services provided by the particular service provider.

16. One or more non-transitory computer storage media storing computer executable instructions which when executed in an open access network perform a method for authenticating an end-user device to receive services provided by a service provider prior to establishing a logical network connection between the end-user device and the service provider over the open access network, comprising:
receiving, at a network operator authentication server (NOAS), credentials from a virtual subscriber ID manager (V-SIM manager), the credentials including a user ID associated with an end-user device and a provider ID of a first service provider of a plurality of service providers that provide services over the open access network, the credentials being received before a logical network connection exists between the end-user device and the first service provider within the open access network, the credentials representing a request from the end-user device to establish the logical network connection to thereby allow the end-user device to receive services provided by the first service provider via the logical network connection;
sending the user ID to a service provider authentication server (SPAS) that is associated with the provider ID;
receiving, at the NOAS, an authentication vector from the SPAS, the authentication vector including a challenge and an expected response;
forwarding the challenge to the V-SIM manager;
identifying, by the V-SIM manager, a service provider profile that is associated with the provider ID and employing the service provider profile to generate a response to the challenge;
receiving, at the NOAS, the response to the challenge and comparing the response to the expected response that was defined in the authentication vector;
upon determining that the response matches the expected response, obtaining a transaction ID to represent a logical network connection over the open access network; and
sending the transaction ID to the first service provider to allow the first service provider to request the establishment of the logical network connection between the end-user device and the first service provider such that the logical network connection between the end-user device and the first service provider is not established in the open access network until after the end-user device has been authenticated to receive services provided by the first service provider.

17. The computer storage media of claim 16, wherein the V-SIM manager executes on the end-user device.

18. The computer storage media of claim 16, wherein the V-SIM manager executes on an optical network terminal to which the end-user device is connected.

19. The computer storage media of claim 16, wherein the V-SIM manager executes on an emergency services device to which the end-user device is connected.

20. The computer storage media of claim 16, wherein the method further comprises:
receiving, from the first service provider, the transaction ID; and
establishing the logical network connection between the end-user device and the first service provider.

* * * * *